United States Patent
Horton

Patent Number: 5,215,349
Date of Patent: Jun. 1, 1993

[54] SUPPORT SYSTEM FOR FLEXIBLE SIDE WALLS FOR CARGO VEHICLES

[75] Inventor: Terry F. Horton, Whittier, Calif.

[73] Assignee: Utility Trailer Manufacturing Company, City of Industry, Calif.

[21] Appl. No.: 804,846

[22] Filed: Dec. 6, 1991

[51] Int. Cl.$^5$ .............................................. B60J 5/06
[52] U.S. Cl. ................................... 296/181; 296/183
[58] Field of Search .................. 296/181, 183, 155; 160/84.1, 277, 186

[56] References Cited

U.S. PATENT DOCUMENTS

| | | | |
|---|---|---|---|
| 4,545,611 | 10/1985 | Broadbent | 296/183 |
| 4,762,361 | 8/1988 | Horton et al. | 296/181 |
| 4,795,208 | 1/1989 | Whiteman | 296/181 |
| 4,826,236 | 5/1989 | Bennett | 296/181 |
| 4,943,110 | 7/1990 | Pastva | 296/181 |
| 4,952,009 | 8/1990 | Mountz et al. | 296/181 |

Primary Examiner—Robert R. Song
Attorney, Agent, or Firm—Lyon & Lyon

[57] ABSTRACT

A support system for a flexible side wall for cargo carrying vehicles that allows greater access to the cargo area of the vehicle. A slidable door is attached to the flexible side wall which is supported by vertical support poles and the door and wall can be slid along the vehicle for access to the open side of the cargo vehicle. The slidable door is narrow to maximize the access and is supported by a separate track and roller assembly. The door may be supported by the roller assembly being positioned either at the roof or floor area of the cargo vehicle. The roller assembly has wheels at a predetermined spacing larger than the door width to accommodate any pushing force couple produced by the operator pushing or pulling on the door for opening and closing same. The vertical support poles are aligned by pilot blocks that have an interlocking feature which interconnect with the adjacent pilot blocks and align the flexible sidewall when it is being compacted.

12 Claims, 3 Drawing Sheets

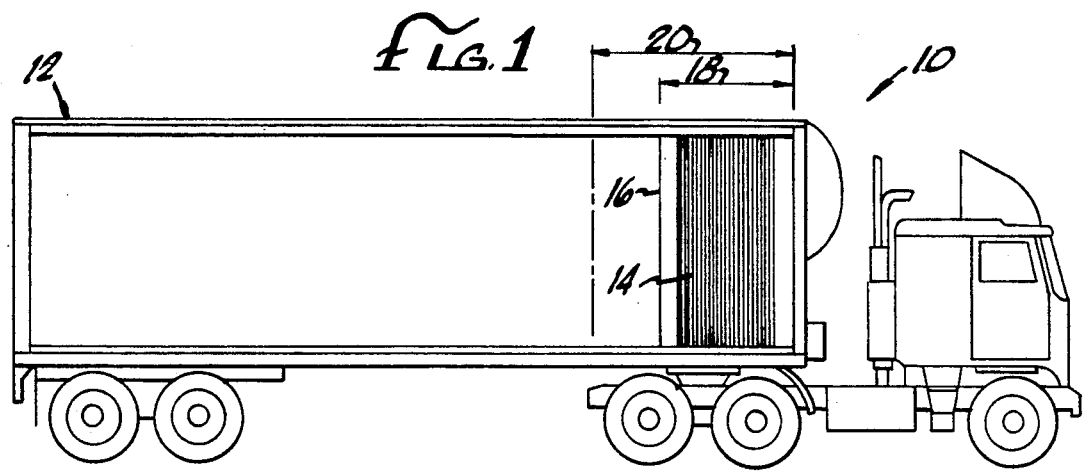
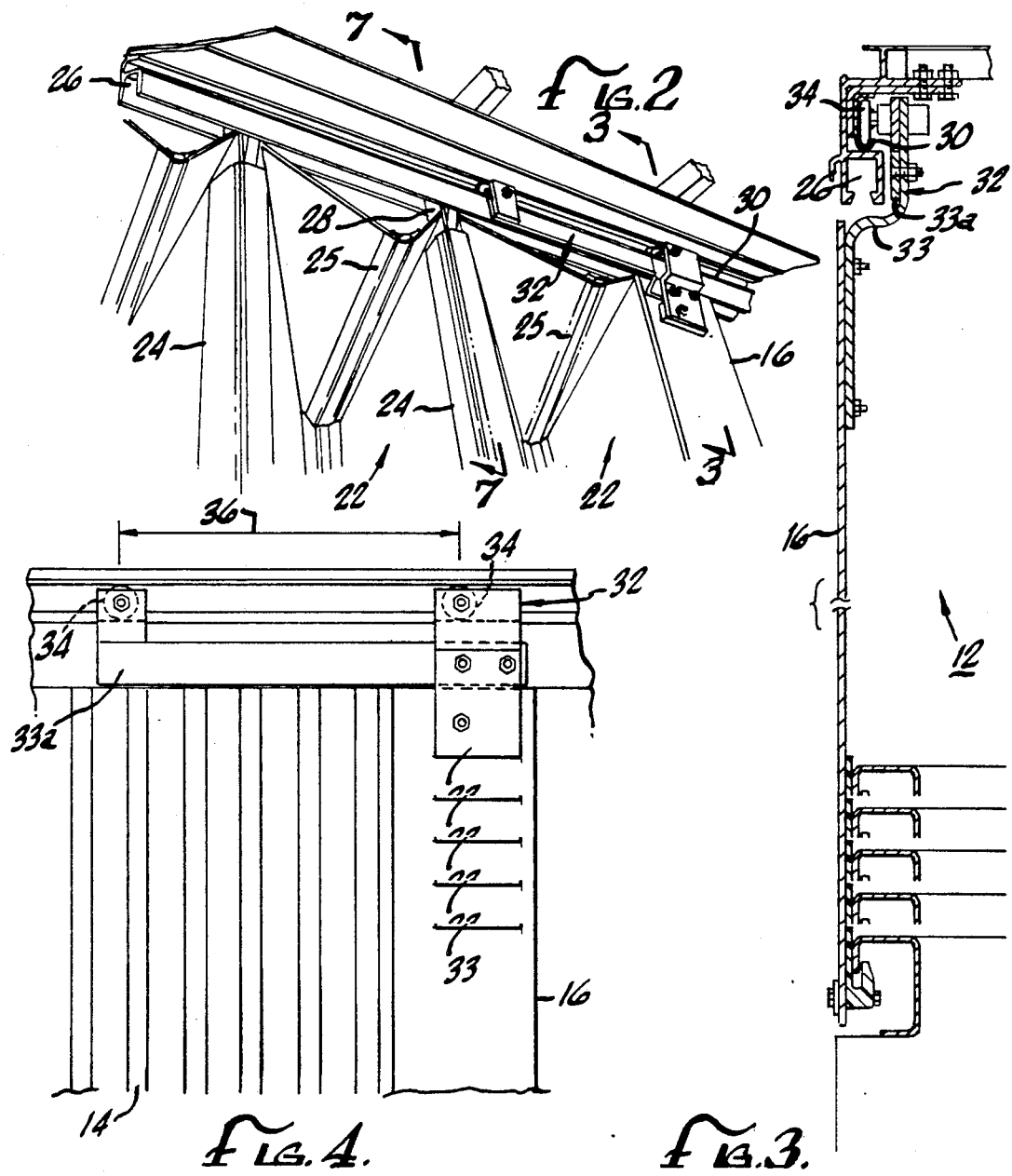

SUPPORT SYSTEM FOR FLEXIBLE SIDE WALLS FOR CARGO VEHICLES

The present invention relates to support systems for the flexible side walls of cargo carrying vehicles, such as trucks and trailers. It is desirable to have a cargo vehicle with a flexible side wall to provide the greatest access to the cargo area by opening the flexible side wall. In conventional flexible side wall systems, such as those systems described in U.S. Pat. No. 4,545,611 and U.S. Pat. No. 4,762,361, a flexible curtain and slidable end doors are suspended from a common track which is attached to the roof of the cargo area. Horizontally spaced support poles support the weight of the flexible curtain by pole-mounted rollers supported for rolling movement on this track. The slidable end doors are supported by two rollers mounted on each door in a spaced relationship and those rollers are also supported by this track.

For opening and closing the flexible side wall, the pulling or pushing force is normally applied by an operator standing at ground level, who pulls or pushes the slidable door near its lower edge. However, this is approximately seven to nine feet below the rolling support and resistance of the track at the roof level. Therefore, this pushing or pulling creates a rotational couple between the two rollers at the top of the slidable door which often is sufficient to cause binding and non-rolling movement of these rollers before the full side opening is achieved. Also, the conventional rolling support assemblies on the flexible wall and the door rollers accumulate a considerable amount of drag. This drag is progressive as the sliding resistance of each additional support pole is added as the door is opened progressively wider during opening and is closed progressively during closing.

Conventional systems attach the two door rollers to the door with as much separation or wheelbase as possible, suggesting the necessity for a comparatively wide door in an effort to overcome these problems. However, this is contrasted with the needs during loading and unloading situations where it is desirable to develop the widest possible side opening by providing the narrowest door possible. This leads to the unwanted reduction in the wheelbase of the rollers, so that the door becomes difficult to pull or push. A fully loaded cargo area will also naturally bend or flex when loaded. This also causes the conventional slidable doors to bind up.

Also, the vertical support poles of the conventional systems twist out of alignment while the flexible curtain is being compacted. It is desirable to have the support poles remain substantially parallel to the slidable door to allow the flexible curtain to fold as compactly as possible. A support pole which is out of alignment significantly increases the drag forces resisting opening of the door.

It is an object of the present invention to provide an improved support system for flexible side walls for cargo carrying vehicles. The present invention allows cargo vehicles with flexible side walls to incorporate very narrow end doors for maximum side loading access, but the doors can still be opened by an operator standing at ground level. In each of the embodiments described herein, the present invention serves to align the drag force from the flexible side wall and slidable door with the pushing force to allow the door to operate when the cargo area is loaded and to maintain the alignment of the supporting or primary poles.

The present invention allows for an adequate roller wheelbase while using a very narrow door with flexible side wall type cargo vehicles. The slidable door is suspended from a second track located inboard of the roof rail track, or first track, that supports the flexible side wall. Specifically, the narrow door is suspended from a roller assembly attached to wheels and is positioned inboard of the flexible side wall so as to clear the wall in both open and closed positions. The wheels of the door roller assembly may be spaced at a relatively large predetermined wheelbase, without increasing the width of the door.

A feature of the invention utilizes a slidable door with a roller assembly that is conventionally mounted near the upper edge of the door. Alternatively the roller assembly could be mounted near the lower edge of the door at the floor of the cargo area to more nearly align the drag force with the pushing and pulling effort from the operator.

Another feature of the present invention reduces the amount of drag created by the pole rollers that support the flexible side wall and more nearly aligns that drag with the pushing effort by providing the guide rollers on the supporting poles or primary poles on the lower end of the poles rather than at the upper end. A track and guide system at the top of the primary poles aligns the top of the flexible side wall without supporting the weight of the side wall from the top.

In another feature of the present invention, each primary pole is urged into a substantially parallel alignment with the slidable door. The primary poles are pushed through mechanical pilot blocks at the bottom of each primary pole and not through the flexible side wall itself. In order to keep the guide rollers aligned in a substantially straight mode, the pilot blocks may be "V" shaped at one end and have a notch at the opposing end to engage and fit into the "V" shaped end of the adjacent pilot block. Pushing the pilot blocks will align them into one substantially straight pattern and in turn align the rollers so they and the flexible side wall will move down the open side of the cargo area with a minimum of drag.

Accordingly, it is an object of the present invention to provide an improved support system for flexible side walls. Other and further objects and advantages will appear hereinafter to those skilled in the art from the following description and the accompanying drawings, wherein:

FIG. 1 illustrates the flexible sided cargo vehicle with the cargo area open.

FIG. 2 shows the track support system of this invention for the slidable door and the flexible side wall from the interior of the cargo area.

FIG. 3 is a sectional end view of the slidable door and its second track taken along line 3—3 of FIG. 2.

FIG. 4 is an elevation view of the slidable door and the roller assembly from the interior of the cargo area.

Figure 5A:
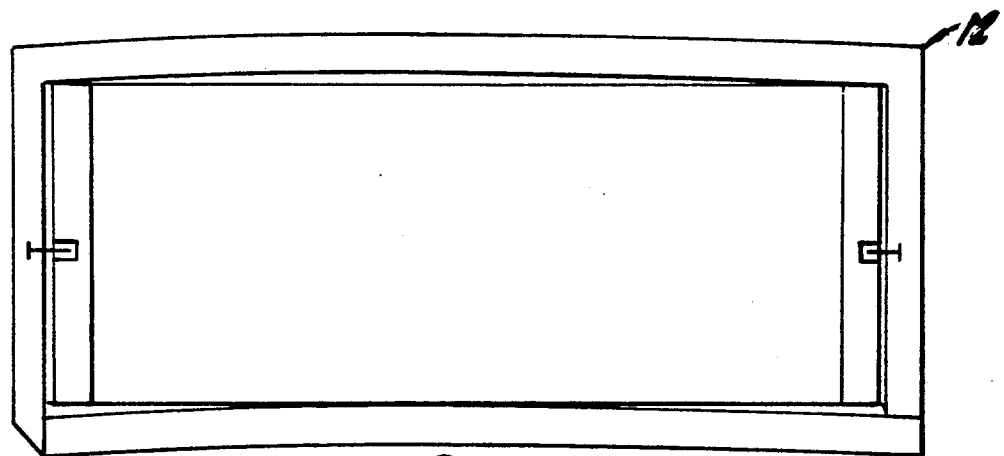
FIG. 5a illustrates the cargo area in an unloaded configuration.

Referring now to the figures in greater detail, a cargo vehicle 10 is shown with the exposed cargo area 12 therein in FIG. 1. The flexible side wall 14 is shown in FIG. 1 in the compacted position with the slidable door 16 connected to it. The slidable door 16 is narrower in construction than in prior art constructions, which permits the flexible side wall 14 to be compacted into a first length 18 which is shorter than a conventional system's length, shown as a second length 20.

As shown in FIG. 2, the flexible side wall 14 is comprised of a plurality of panels 22 between primary poles 24 which are horizontally spaced along the flexible side wall 14. An intermediate pole 25 is located between each pair of primary poles 24 and serve to ensure uniform folding of the panels 22 by flexing the upper end of the panel 22 inwardly and the balance of the panel 22 outwardly to thereby ensure a compact, pleated fold.

Each primary pole 24 is affixed to a first guide 28 which engages a guide channel or first track 26, thereby positioning the flexible side wall 14 in a plane in the closed condition along the length of the first track 26. Unlike the prior art systems, there are no rollers mounted on the upper end of primary poles 24 for suspending the flexible side wall 14 from track 26 but rather the wall 14 preferably is supported from the bottom, as will be described below in connection with FIG. 7.

The slidable door 16 is supported on a second track 30 by the roller assembly 32 and its wheels 34 as shown in FIGS. 3 and 4. This second track 30 is located either inboard of or above the flexible side wall 14 as shown in FIG. 3. The roller assembly 32 includes bracket 33 mounted on the top of the door 16 with extension 33a extending beyond the edge of door 16 to overlap the location of the flexible side wall 14. The wheels 34 are spaced at a predetermined spacing 36 on bracket 33 which better accommodates the rotational force couple produced by the operator pushing the lower end of the door 16 while he stands at ground level.

Figure 5B:
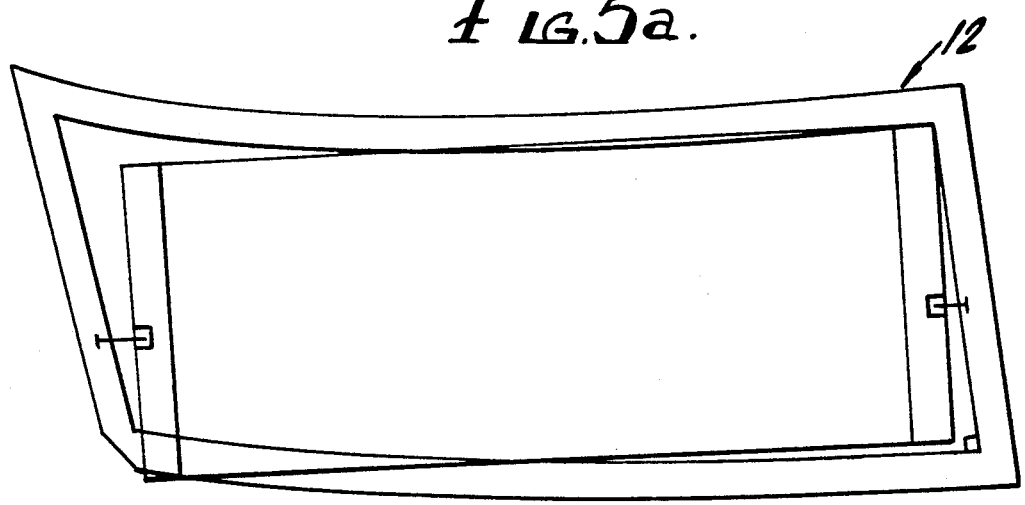
FIG. 5b illustrates, in exaggerated form, one loaded configuration of the cargo area wherein the side opening is distorted as a result of the load.
Figure 6:
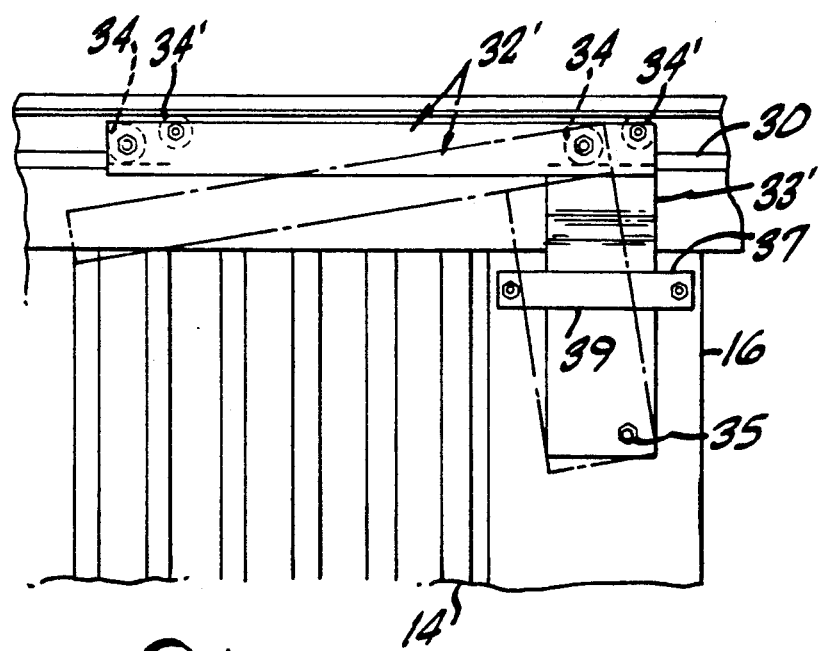
FIG. 6 illustrates the relative positions of the door rollers when the cargo area is unloaded and loaded.

A modified embodiment of the roller assembly 32 is shown in FIG. 6 as roller assembly 32' which allows the slidable door 16 to flex relative to the track 30 when the cargo area 12 goes from an unloaded condition as shown in FIG. 5a to a loaded condition shown in FIG. 5b. FIG. 6 illustrates in solid and phantom lines how the slidable door 16 and roller assembly 32' can cooperate and flex with the loaded cargo area 12. The bracket 33' is pivotally mounted on door 16 by a bolt 35 and another bracket 37 mounted on door 16, by a slot 39 that confines and limits the movement of bracket 33'. Additional rollers 34' are provided to engage the top of the track 30 and thereby maintain the integrity of the flexible side wall 14 and door 16 in the loaded condition.

Figure 7:
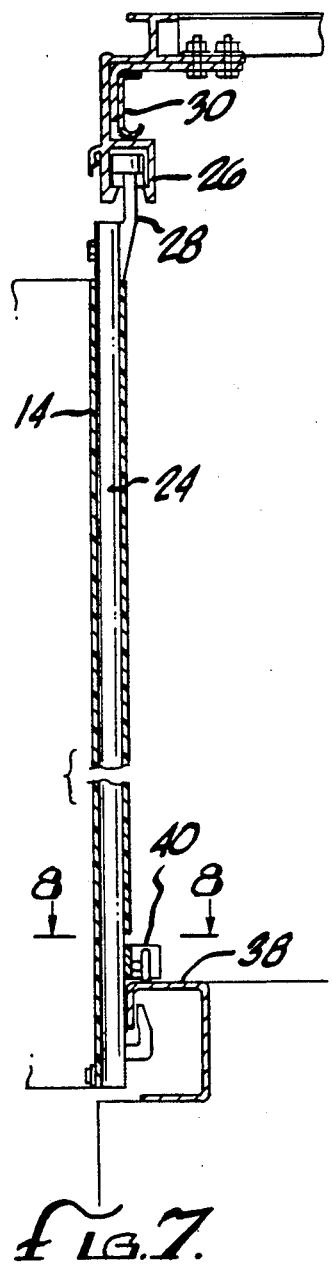
FIG. 7 is a sectional end view of the primary pole and flexible side wall taken along line 7—7 of FIG. 2.
Figure 8:
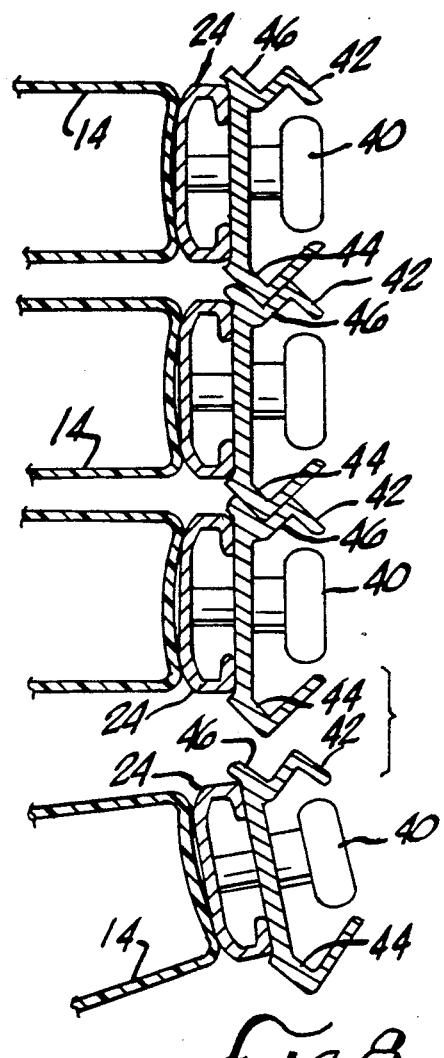
FIG. 8 is a sectional plan view taken through line 8—8 on FIG. 7 illustrating the pilot blocks and guide rollers.

As shown in FIG. 7, the flexible side wall 14 is preferably supported on the floor 38 of the cargo area 12 to align the rolling resistance with the force applied by the operator to the slidable door 16 which is usually at the bottom. The flexible side wall 14 is supported by the vertically extending primary poles 24, each of which has a guide roller 40 affixed to the lower end of the primary pole 24. At the floor 38, a pilot block 42 is affixed to each primary pole 24, as shown in FIG. 8. Each pilot block 42 includes convex V-shaped interlocking means 44 on one end and a concave V-shaped engagement means 46 on the other end which are adapted to engage with those means on the adjacent pilot block 42 in a corresponding fashion. This maintains the primary poles 24 and rollers 40, and consequently the flexible side wall 14, in a substantially straight fashion. This also more nearly aligns the flexible side wall 14 with the pushing or opening force applied by the operator.

Figure 9:
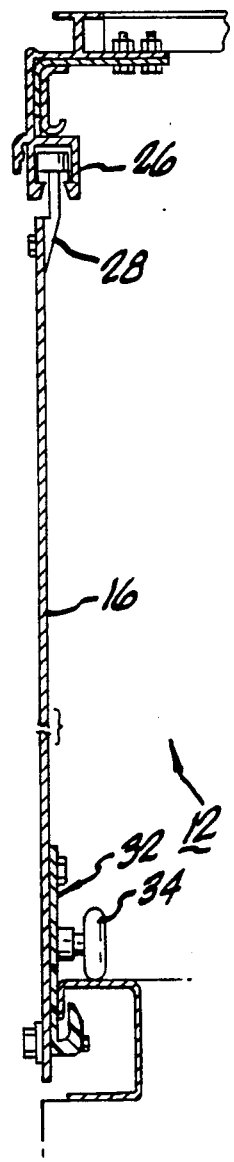
FIG. 9 is a side view of the slidable door with the roller assembly and rollers mounted on the lower end of the door and a guide positioned on the upper end of the door.

As a further modification of this invention, the sliding door 16 can be supported by rollers 40 mounted on the lower end of the door 16 and engaging the floor 38 as shown in FIG. 9. Such rollers 40 may be attached directly to the door 16 or to a bracket mounted on the door 16 similar to bracket 33 with an extension similar to extension 33a whereby those components can be eliminated from the top of the door 16 and replaced by a guide means similar to guide 28.

While the preferred embodiment of the present invention and modifications thereto have been shown and disclosed in the drawings and specification, alternate embodiments of the present invention may be apparent to a person of ordinary skill in the art and this application is intended to include those embodiments within the scope of the claims herein. Moreover, the present invention need not include all of the features disclosed in a single embodiment but rather only one or more features may be included.

What is claimed is:

1. A flexible side cargo vehicle having a cargo area with at least one open side and a floor and having a flexible side wall for closing the open side, said flexible side wall is attached to horizontally spaced primary poles defining a plurality of panels thereon with means for slidably guiding the lower ends of said primary poles, the improvement comprising:

said primary poles having upper ends slidably supported in a first track positioned adjacent to the open side; and a slidable door affixed to an end panel of said flexible side wall, said slidable door having one of upper and lower ends slidably supported by a roller assembly engaging a second track adjacent to the open side of the cargo vehicle and the other of the upper and lower ends slidably guided along the open side of the cargo vehicle.

2. The improvement of claim 1 wherein said roller assembly is comprised of at least two wheels spaced apart along the length of the second track at a predetermined spacing greater than the width of the slidable door in the direction of opening and closing.

3. The improvement of claim 1 wherein said roller assembly is comprised of at least four wheels and is detachable from said second track and at least two of said wheels may engage an upper portion of said second track when the cargo area is in a loaded condition.

4. The improvement of claim 1 wherein said roller assembly can cooperate and flex with the loaded cargo area and is mounted to the slidable door by a bracket and slot which confines and limits the flexing of said roller assembly.

5. The improvement of claim 1 wherein said roller assembly is positioned at the floor of said cargo vehicle.

6. The improvement of claim 1 wherein each of said primary poles is affixed to a guide roller and a pilot block at said floor, wherein said pilot blocks have an interlocking means thereon and an engagement means thereon which corresponded to said interlocking means for aligning adjacent primary poles.

7. The improvement of claim 6 wherein said flexible side wall is substantially supported by said guide rollers.

8. A cargo carrying vehicle having an open side with a flexible side wall supported on the vehicle for closing and opening the open side, an improvement comprising, a slidable door connected to one end of the flexible side wall for causing the opening and closing of the open side by moving the slidable door along the open side, said slidable door having an upper and lower end, means for slidably guiding one end of said door along the open side, and a roller assembly mounted on said slidable door having a pair of spaced rollers to engage means on said cargo vehicle to slidably guide the other end of said door and slidably supporting said slidable door separate from the support for the flexible side wall, said pair of rollers spaced apart a distance in the direction of opening and closing greater than the width of the slidable door in that direction.

9. The improvement of claim 8 wherein said roller assembly can cooperate and flex with the loaded cargo area and is mounted to the slidable door by a bracket and slot which confines and limits the flexing of said roller assembly.

10. A cargo carrying vehicle having an open side with a flexible side wall supported on the vehicle for closing and opening the open side, a plurality of substantially vertical primary poles horizontally spaced along and operably connected tot he flexible side wall, a slidable door connected to an end of the flexible side wall for closing and opening the flexible side wall by sliding the slidable door along the open side and including means for slidably guiding upper and lower ends of said slidable door, an improvement comprising, a roller provided at a lower end of each primary pole and rollingly engaging a floor portion of the cargo carrying vehicle for supporting the flexible side wall, and means at an upper end of each primary pole engaging means on the cargo carrying vehicle for guiding the closing and opening movement of the primary poles and flexible side wall along the open side of the cargo carrying vehicle.

11. The improvement of claim 10 comprising pilot blocks affixed to the lower end of each of said primary poles wherein said pilot blocks have an interlocking means thereon and an engagement means thereon which corresponds to said interlocking means for aligning adjacent primary poles.

12. A flexible side cargo vehicle having a cargo area with at least one open side and a floor and having a flexible side wall for closing the open side, said flexible side wall is supported on said cargo vehicle and is attached to horizontally spaced primary poles defining a plurality of panels thereon, the improvement comprising:

upper ends of said primary poles slidably supported in a first track along said open side;

a slidable door affixed to an end panel of said flexible side wall with means for slidably guiding an upper end of the slidable door, said means engaging said first track; and a roller assembly secured to a lower end of said slidable door and engaging said floor to slidably support said slidable door.

* * * * *